March 15, 1960     F. V. JENSEN     2,928,524
FOOD BROILING OVEN

Filed Feb. 18, 1957     5 Sheets-Sheet 1

INVENTOR.
FRANK V. JENSEN
BY
*Robert A. Sloman*
ATTORNEY

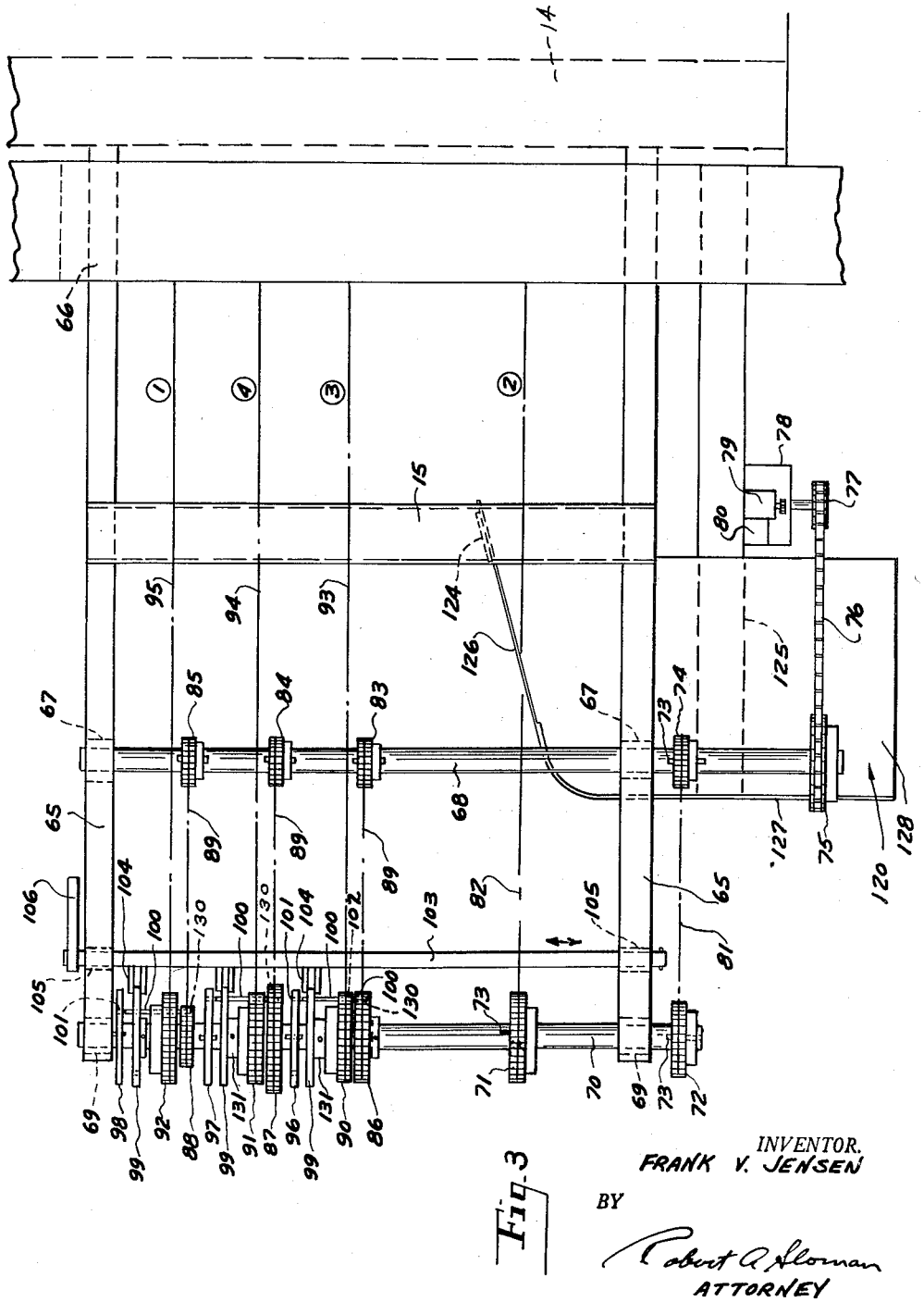

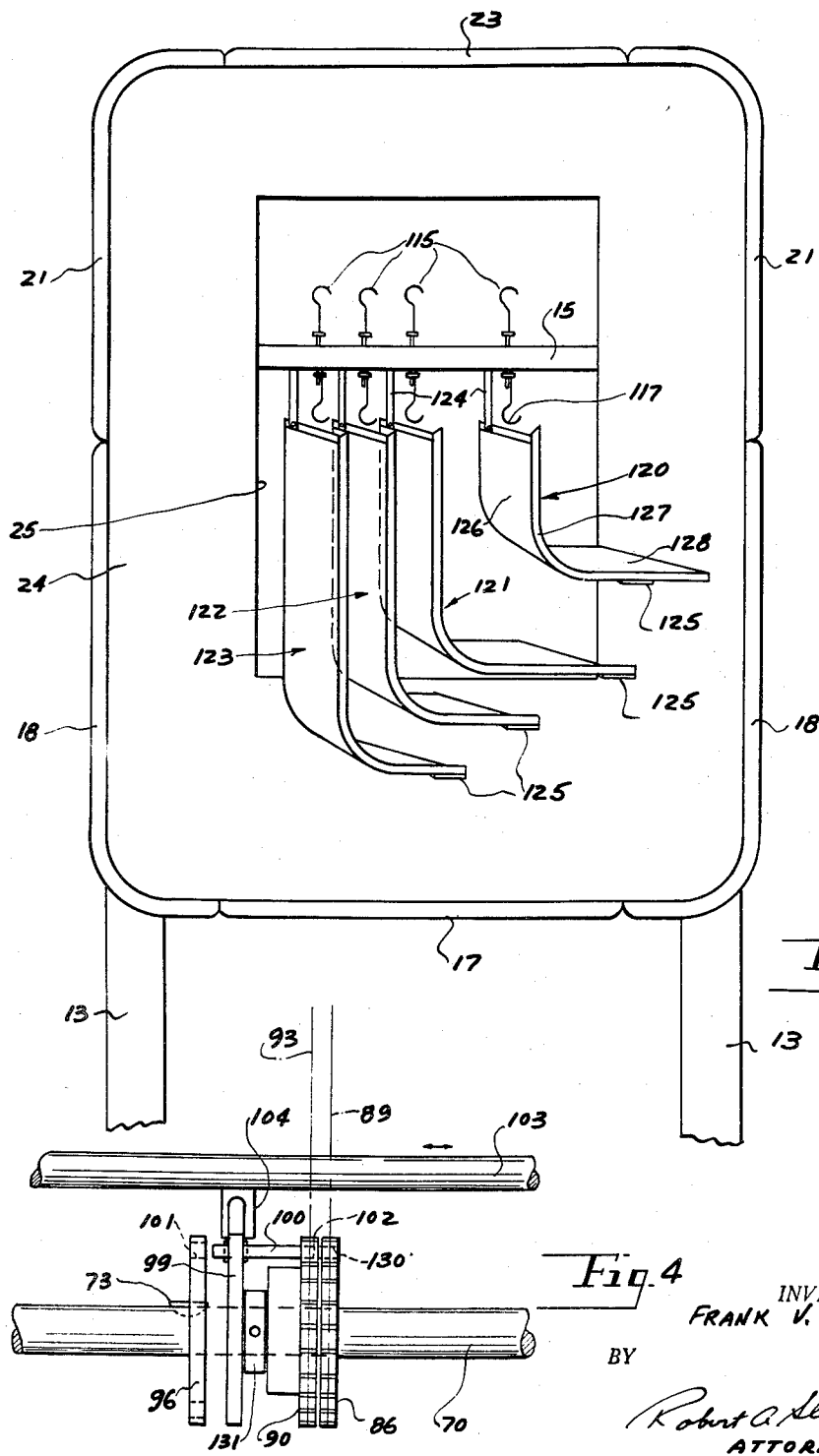

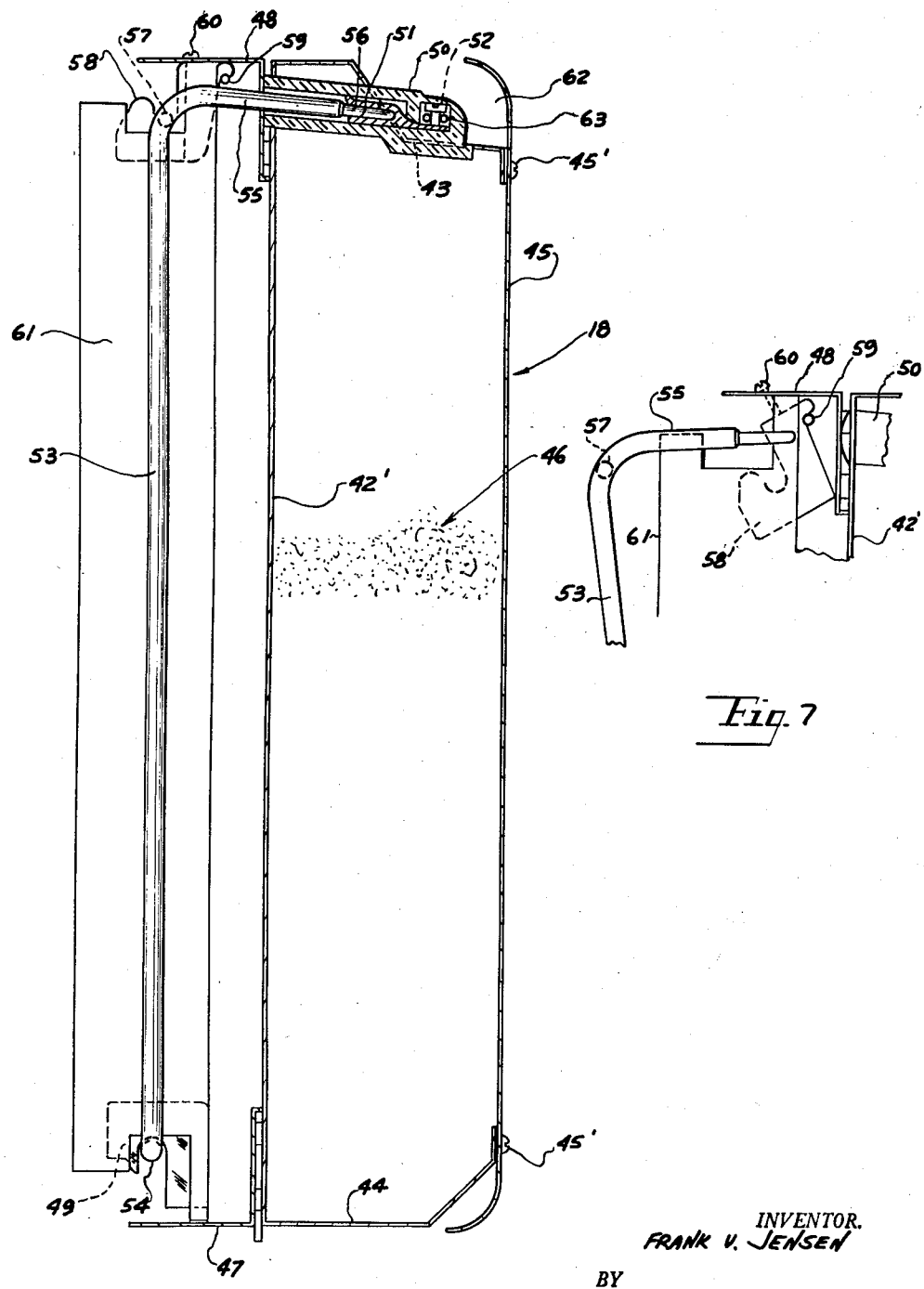

United States Patent Office 2,928,524
Patented Mar. 15, 1960

2,928,524

FOOD BROILING OVEN

Frank V. Jensen, Detroit, Mich.

Application February 18, 1957, Serial No. 640,720

7 Claims. (Cl. 198—76)

This invention relates to a food broiler oven and more particularly to a novel oven construction including a series of differentially movable food conveyors extending therethrough.

Heretofore there has long existed a need for a mechanical food broiling oven such as might be used in hotels or restaurants for mass producing or mass cooking, for example, a large number of steaks and wherein some are to be rare, some medium and some well done.

There has furthermore existed the need of a broiler type of oven wherein various foods such as other forms of meat or seafood may be continuously traversed through a high temperature broiling oven simultaneously broiling on both sides, with the time of cooking depending upon the object to be broiled and the amount of cooking desired.

It is the object of the present invention to provide a novel form of food broiling oven which operates at relatively high temperatures i.e., between 400–600 degrees F. and which has movable therethrough a series of parallel spaced conveyors adapted for motion at different or similar speeds.

It is a further object of the present invention to provide a novel panel construction for providing infrared radiant heat from the interior side walls and top wall of the oven for application to articles of food moving continuously therethrough.

It is a further object of the present invention to provide control means for the series of conveyors whereby the same may move simultaneously at the same or different speeds.

It is a further object of this invention to provide with each of said conveyors a series of longitudinally spaced depending food supporting hooks together with food disengaging means or unloaders arranged at one end of the oven for removing the cooked food from said hooks and supporting the same for immediate use.

It is a further object of this invention to provide supporting guide means extending throughout the broiling oven whereby certain foods may be cooked in platters which are slidably supported and continuously moved throughout the length of the oven.

It is a further object of the present invention to provide a novel overall broiling oven capable of mass producing large numbers of steaks, chops, chicken, seafood, etc., by conveying the same therethrough at predetermined and varying speeds.

These and other objects will be seen from the following specification and claims in conjunction with the appended drawings in which:

Fig. 3 is a fragmentary plan view of a portion of the broiling oven illustrating the sprocket drive mechanism for the conveyors.

Fig. 4 is a fragmentary plan view of a part of the conveyor speed changing mechanism shown in Fig. 3, but on an enlarged scale.

Fig. 5 is a fragmentary left end elevational view of the broiler similar to Fig. 2 but showing the food disengaging and supporting plates for the respective conveyors.

Fig. 6 is a fragmentary elevational section illustrating one of the insulated oven panels with its heating elements.

Fig. 7 is a fragmentary elevational section of the upper portion only of the panel shown in Fig. 6 illustrating the disengagement of the heating element terminals, and method of locking.

Fig. 8 is a side elevational view of a portion of the return flight of one of the conveyors with a food supporting hook projecting upwardly therefrom.

Fig. 9 is a right side elevational view thereof.

It will be understood that the above drawings illustrate merely a preferred embodiment of the invention and other embodiments are contemplated within the scope of the claims hereafter set forth.

*Oven framework and body*

Figure 1:
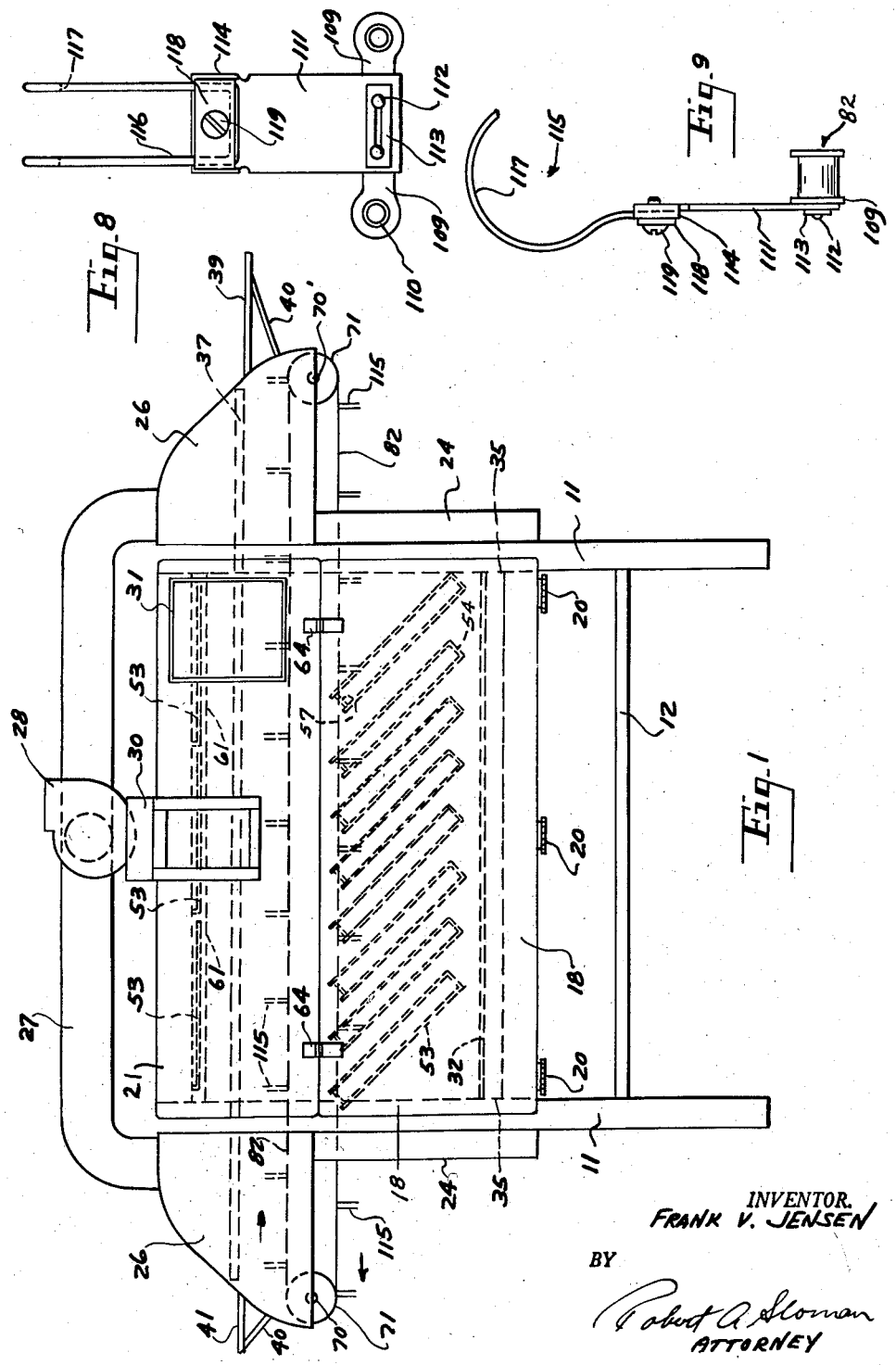
Fig. 1 is a side elevational view of the present food broiler.
Figure 2:
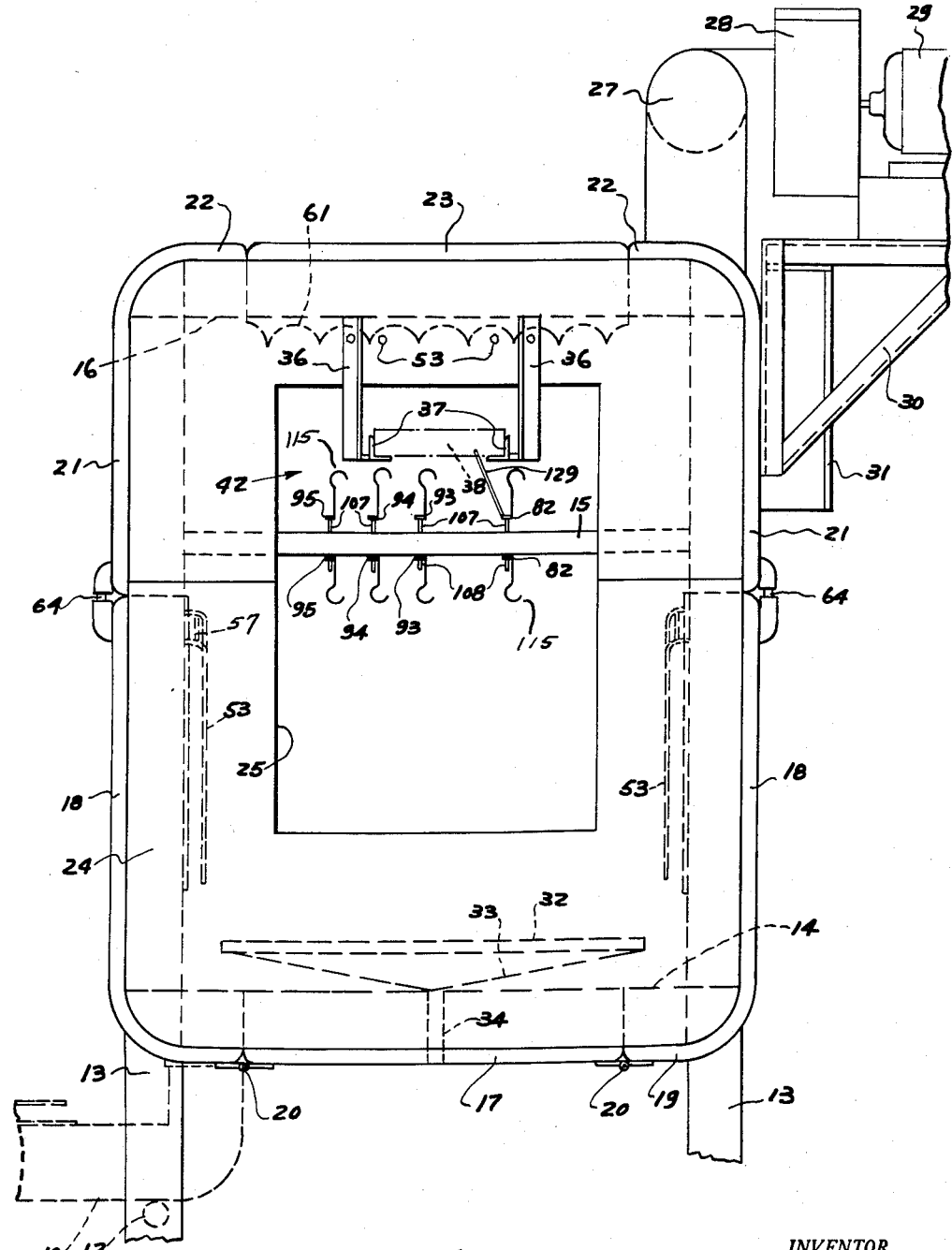
Fig. 2 is a fragmentary left end elevational view thereof on an enlarged scale.

Referring to the drawings and particularly Figs. 1, 2 and 5, the present food broiling oven consists of a pair of parallel spaced transverse upright frames 11 which are interconnected upon their opposite sides by the longitudinal braces 12, one of which is shown in Fig. 1.

Each of the frames 11 include the upright legs 13 which are interconnected towards their lower ends by cross supports 14, Fig. 2, by intermediate conveyor supporting plates 15, and upper cross supports 16.

The oven is in the nature of an elongated hollow insulated shell which includes a series of cooperating insulated oven panels. For this purpose, and as shown in Fig. 2, there is provided an elongated panel 17 which forms the central bottom wall of the oven and which interconnects the upright end frames 11 of Fig. 1.

There are provided upon opposite sides of the oven the upright insulated panels 18 between frames 11 which form the side walls of the oven for a portion of its height. These side walls terminate at their lower ends in the right angularly related panel elements 19 which register with bottom panel 17 forming a lateral continuation thereof. Panel elements 19 are each respectively connected pivotally by the series of longitudinally spaced hinges 20 to lower portions of the central bottom panel 17, on its opposite sides.

This construction permits side panels 18 to be pivoted outwardly 90 degrees to the dotted line position shown in Fig. 2, resting upon supports 12. It also facilitates inspection of the oven or replacement of the heater elements, hereafter described, which are mounted upon the interior surfaces of said panels.

The side walls of the oven are completed by a pair of spaced elongated upper side panels 21 which also extend between frames 11 and are suitably mounted and secured upon the aforementioned framework.

Panels 21 terminate at their upper ends in the right angularly related inwardly directed top panel elements 22 which cooperate with the intermediate elongated top panel 23, thus completing the insulated broiler oven shell.

Hollow insulated end walls 24 are provided at opposite ends of the oven body, and have central rectangular apertures 25 through which extend portions of the food conveyors, hereafter described in detail.

Exhaust collecting hoods 26, suitably apertured at their ends, are arranged upon opposite ends of the oven body and connect at their upper ends the horizontally disposed exhaust conduit 27 which overlies the oven body and has joined thereto the exhaust fan 28 adapted for connection to a suitable stack. Motor 29 on frame 30 upon one side of the oven body provides power to said fan.

Fig. 2 also illustrates a control cabinet 31 within which terminate all control elements which may be employed in the operation of the oven but whose specific construction is omitted herein.

An elongated rectangularly shaped drip pan 32 is positioned at the lower end of oven chamber 42, as shown in Fig. 2, and has downwardly converging bottom walls 33 connected with drain 34. The opposite ends of the drip pan are secured to end frames 11 as at 35, Fig. 1.

Depending from frame elements 16 at opposite ends of the oven body are a pair of spaced centrally arranged angle irons 36 whose respective lower ends mount and support a pair of laterally spaced horizontal guide channels 37 over which may be slidably positioned and moved a series of food containers 38 indicated by dotted lines in Fig. 2.

Loading and unloading platforms 39 and 41 suitably supported at 40 upon the oven frame are arranged at opposite ends of the oven, and at a level as to receive the utensil 38 either for initiating its movement on the guides 37 or for receiving the same at the end of its traverse through the oven. It is required that the hoods 26 be suitably apertured to provide access to platforms 39 and 41.

Oven panel construction

Referring to Fig. 6 there is shown on an enlarged scale a portion of one of the insulated panel elements 18 which form the body of the oven. Said panel element includes an inner heat and moisture resistant wall 42' which terminates in the horizontally disposed top wall 43 and the horizontal bottom wall 44 whose inwardly directed flanges receive the removable insulation retaining panel cover 45, employing fasteners 45'.

Cover 45 confines with respect to panel walls 42', 43 and 44 a quantity of insulating material such as glass wool or the equivalent, approximately four inches thick, for illustration.

Said panel includes upon the interior of wall 42' the inwardly directed bottom wall element 47 and opposed thereto the inwardly direct horizontal top wall element 48. Mounted upon and adjacent bottom wall 47 are a series of longitudinally spaced heater mounting pivots 49 constructed of a ceramic material such as porcelain. These are adapted to cooperatively receive respectively the bights 54 of the individual elongated U-shaped electric resistance heater rods 53, whose free upper ends terminate in a pair of right angularly related outwardly extending parallel bars 55 spaced and interconnected by the transverse lock bar 57.

Ceramic receptacles 50 are positioned within the upper end portions of the insulated outer portion of the panel, as shown in Fig. 6, and project partly therethrough wall 42'. These contain metallic sockets 51 adapted for connection at 52 to an electrical circuit 63. Said sockets supportably receive the terminals 56 of the respective U-shaped heater elements 53.

Inwardly of the upper portion of wall 42' there are provided L-shaped heater locks 58 pivotally mounted at 59 with a suitable lock screw 60 secured thereto as shown in Fig. 7.

After the free ends 55 are properly positioned within the panel with the terminals 56 within their sockets 51, the lock 58 is rotated clockwise from the position shown in Fig. 7 to the position shown in Fig. 6 retainingly engaging the lock bar 57 for effectively securing the electric resistance infra red U-shaped heater in the position shown in Fig. 6. A series of these heaters 53 are employed with separate pivots 49 and receptacles 50 for each heating element.

Adjacent the inner surface of wall 42' and extending under each of the legs 53 of the electric resistance heaters is an elongated transversely arcuate aluminized reflector 61, also illustrated in Fig. 2 for directing the heat inwardly in chamber 42. The upper end portion of the coverplate 45 for the panel in Fig. 6 provides a trough 62 upon the exterior of the oven adapted to receive the wiring or electrical circuits 63 which provide electrical energy to the respective heating elements. Thus the wires are remote from the heated oven chamber.

As shown in Fig. 1 there are provided upon the interior of each of the side panels 18 a series of U-shaped electric resistance heaters 53, in parallel spaced relation and preferably inclined at an acute angle to the horizontal. Thus an upright object suspended from a conveyor, such as a steak, receives uniform heating at all times during its traverse through the broiler.

The advantage of arranging the heating elements at such angle is that there is an overlapping of the respective heater elements 53 in such fashion that there will be a constant intensity of heat applied to all portions of the article as it is transmitted through the oven on its respective conveyor.

Both of the side wall panels 18 have mounted upon their interiors in insulated relation a series of inclined electric resistance heaters 53 which in the present embodiment deliver a broiling temperature which may be set as desired between 400–600 degrees F., for illustration.

A series of said electric resistance heaters 53 are also mounted horizontally upon the inner surface of the top oven panel 23 as shown in Figs. 1 and 2, and these heaters are also provided with a series of transversely arcuate aluminized reflectors 61 whereby a uniform broiling heat is maintained at all times as the food objects are moved continuously through the oven on their respective conveyors. Thus broiling occurs on all food surfaces simultaneously.

One advantage of this construction is that such uniform broiling traps most of the juices upon the interior of the article cooked.

As shown in Figs. 1 and 2 suitable connectors 64 provide a means of securing panels 18 in closed position.

Conveyor mechanism

The present broiler includes suitable framework in addition to the crossbraces 15 for mounting the shafts which drive the various conveyors forming a part of the present invention.

Fig. 3 is a plan view on an enlarged scale of the support mechanism and the various drive sprockets by which power is transmitted to the respective conveyors. A pair of rearwardly extending frames 65 are anchored to the oven framework as at 66 and intermediate their ends are suitably secured to the transverse conveyor support 15.

Inwardly of the ends of supports 65 are bushings 67 which support and journal transverse power shaft 68. Additional bushings 69 at the outer ends of supports 65 journal and support the driven shaft 70 which has keyed thereon as at 73 a pair of sprockets 71 and 72. A similar sprocket 74 smaller than sprocket 72 is keyed at 73 to shaft 68 and is connected in driving relation to sprocket 72 by sprocket chain 81.

The enlarged sprocket 75, suitably secured to shaft 68 is connected by chain 76 to the drive sprocket 77 which projects from the speed reducer 78, in turn suitably connected with electric motor 79 and timer 80.

The first conveyor 82 as indicated in Fig. 3, extends around driven sprocket 71. This is a continuous conveyor and accordingly the opposite end of conveyor 82 extends around another sprocket 71 loosely journaled upon transverse shaft 70'.

As shown in Fig. 2 there are provided a pair of vertically aligned longitudinal flanges 107 and 108 which extend between cross supports 15 and which are adapted to slidably support both flights of the conveyor chain 82 in a conventional manner.

A series of additional drive sprockets 83, 84 and 85, similar to sprocket 74, are also keyed to shaft 68. These sprockets are respectively interconnected to an additional set of sprockets 86, 87 and 88 loosely journaled upon shaft 70, by a series of short sprocket chains 89. Also loosely journaled upon shaft 70, and adjacent each of the sprockets 86, 87 and 88 are a second set of conveyor drive sprockets 90, 91 and 92.

The said sprockets 86, 87 and 88 are of different diameters whereby when these sprockets are connected in driving relation with the respective sprockets 90, 91 and 92, said latter sprockets will turn at different speeds. Sprockets 90, 91 and 92 are the same size as sprocket 71 so that if the sprockets 90, 91 and 92 receive their power directly from shaft 70, then in that case all four of the conveyors 82, 93, 94 and 95 will operate at the same speed.

The sprockets 90, 91 and 92 are arranged in driving relation with a corresponding set of additional conveyors 93, 94 and 95, whose opposite ends not shown in Fig. 3 extend around suitable corresponding idle sprockets mounted upon the transverse shaft 70' shown in Fig. 1.

In this connection there are additional supporting flanges 107 and 108, as shown in Fig. 2, above and below the transverse frame members 15 for slidably supporting both flights of conveyor chains 93, 94 and 95.

*Conveyor speed control*

Mechanism is now described whereby the conveyors 93, 94 and 95 may be driven at differential speeds by utilizing the drive sprockets 83, 84 and 85. The same mechanism when adjusted permits the selective setting so that all of the conveyors may operate at the same speed with the drive being through shaft 70.

A series of spaced driving discs 96, 97 and 98 are keyed to shaft 70 for rotation therewith. There is also provided upon shaft 70 a series of laterally shiftable control discs 99 which are loosely mounted upon shaft 70, each such disc 99 carrying adjacent its periphery an elongated transverse pin 100 whose opposite ends extend beyond opposite sides of the said disc.

Each of the pins 100 extend through a corresponding aperture 102 formed in the respective conveyor driving sprockets 90, 91 and 92 for rotation in unison. In the position of each of the slidably adjustable discs 99 shown, as limited by the stop collars 131, the one end of the pins 100 project into apertures 130 in adjacent driven sprockets 86, 87 and 88. This structure is shown on an enlarged scale in Fig. 4.

This means that these sprockets, idle on shaft 70, are directly connected to the conveyor drive sprockets 90, 91 and 92 by each of the said pins 100. Accordingly the respective sprockets 86, 87 and 88 being of different size, and driven through shaft 68 impart different speeds to the three conveyors 93, 94 and 95, also different from the speed of conveyor 82.

If each of the discs 99 should be moved laterally from the position in Fig. 3 so that the pins 100 disengage the sprockets 86, 87 and 88, then in that case the opposite ends of the pins 100 will be projected into apertures 101 in the respective three driving discs 96, 97 and 98. These discs rotate at the same speed as sprocket 71. Accordingly all of the conveyors would then travel at the same speed, because discs 99 driven by shaft 70 are directly connected to sprockets 90, 91 and 92 by the pins 100.

For the purpose of effecting simultaneous sliding adjustment of the three control discs 99 there is provided elongated shaft 103 which is slidably mounted at 105 between the supports 65 with a suitable handle 106.

A series of stirrups 104 are secured in spaced relation upon shaft 103 with the ends thereof overlapping and loosely and retainingly engaging control discs 99 so they may be moved simultaneously on shaft 70.

*Conveyor hooks*

As shown in Figs. 1 and 2 each of the respective conveyors include at spaced points the series of depending food supporting hooks 115, Fig. 9. These hooks extend throughout the length of the continuous conveyors and as shown in the drawing will upon their return flights assume the inverted position shown in Figs. 8 and 9.

At the connection between a pair of conveyor chain links 109 having conventional apertures 110 there is provided an upright plate 111 apertured at its lower end to receive the pivot pins 112. Said plate is secured thereon by the slotted locking plate 113 which snaps over the heads of said pins. The upper end of plate 114 terminates in a pair of right angular rearwardly extending flanges 114 between which is positioned the bight 116 of the U-shaped formed hook 115. The legs of said hook bear against the rear surface of plate 111 and engage the interior surfaces of flanges 114 and are retained upon plate 111 by the anchor strip 118 secured to plate 111 by the screw 119 or similar fastener.

The upper portion of the U-shaped hook includes the parallel spaced hook elements 117 which are reverse curved into substantially a semicircle with tapered ends and are adapted for hanging steaks, chops or liver or other foods to be suspended and broiled as they continuously traverse through the oven.

The spaced hook elements 117 are so arranged as to retain the knuckle or joint of a fowl for suspending the same therebetween.

By this construction all of the steaks or other objects to be cooked are broiled on all sides as they traverse the length of the broiler.

*Unloader mechanism*

Suitable means are employed at one end of the broiler as shown in Figs. 3 and 5 whereby the objects of food on their particular conveyor are disengaged from the supporting hooks 115. For this purpose there are provided a series of unloaders 120, 121, 122 and 123 which are arranged at the respective outer ends of each of the conveyors 82, 93, 94 and 95, and suitably supported at 124 and 125.

Each of the said unloaders includes an upright plate 126 which is arranged at an acute angle to the path of outward and upward movement of the particular food supporting hook, as best illustrated in Fig. 3, whereby the said unloader performs a camming action automatically disengaging the food from the hook. The upright unloading plate 126 is curved outwardly at its lower end and merges with lower platform 128. The respective platforms 128 are vertically staggered for clearance.

Each of the unloaders has a food retaining continuous stop flange 127 at its outer edge whereby the article of food is disengaged from the moving hook 117 and slides downwardly and onto the horizontal surface 128 available for immediate use.

*Conveyor operated sliding food support*

Should it be desired to broil fish or other foods like hamburger which can not be conveniently hung, the same may be positioned within metallic containers 38, Fig. 2, and slidably mounted upon the elevated guides 37 which project through the upper portion of the oven chamber 42.

The return flight of one of the conveyors, such as conveyor 82, is employed for effecting movement of containers 38 upon the horizontal guides. For this purpose there are provided a series of spaced upwardly extending inclined operating rods 129 which, as shown in Fig. 2, are secured directly to conveyor 82. The upper ends of the rods operatively engage containers 38 so that upon return movement of the upper flight of said conveyor the containers 38 will be slid horizontally the length of the broiler. Naturally container 38 will move in a direction opposite from the direction of movement of food suspended from the lower flights of the conveyors, and will automatically unload upon the outwardly extending platform 39 shown in Fig. 1.

Operation

In view of the progressive increase in the size of the sprockets 88, 72, 86 and 87, for a control setting of the timer 80 in Fig. 3, conveyor 95 will move the fastest, conveyor 82 the next fastest, conveyor 93 next fastest and conveyor 94 the slowest. As illustrative of the use of the varying speeds of conveyors, conveyor 95 would be used for broiling and producing "rare steaks" and for cooking liver for illustration, making a complete traverse in 10 minutes.

Conveyor 94, being the slowest moving conveyor, would be used for broiling filet mignon, porterhouse, New York sirloin and T-bone steaks, producing a well-done steak. Likewise this slowest moving conveyor would preferably be used for cooking pork and spareribs, with a time traverse of 25 minutes, for illustration.

Conveyor 93 is preferably to be used for pork chops, lamb chops, chicken and medium filet mignon steaks, and lobster, with a time traverse of 16 minutes for illustration.

Conveyor 82 might be used for medium steaks of sirloin, T-bone, porterhouse, except for a medium filet mignon, which would preferably be placed on conveyor 93. An illustrative time traverse for conveyor 82 would be 15 minutes. Likewise food such as fish, ham, ham-steaks or hamburger cooked in utensil 38 would effect a complete traverse for illustration in 15 minutes.

These illustrative times may be varied by control of a suitable timer dial forming a part of the conventional timer 80, the detail of which forms no part of the present invention.

Having described my invention reference should now be had to the claims which follow.

I claim:

1. In a food broiling oven having a framework, a body and end walls, a series of laterally spaced parallel conveyors movably mounted upon said framework and extending horizontally through central portions of said body and outwardly of said end walls, a series of longitudinally spaced food supporting hooks projecting from said conveyors throughout their length, a power driven shaft mounted on said framework transversely of said conveyors, a second driven shaft on said framework parallel to and connected with the first shaft, a series of drive sprockets of the same size on said second shaft corresponding to each conveyor and operatively joined thereto in driving relation for moving said conveyors at the same speed, a series of sprockets of different sizes loosely journaled on said second shaft corresponding to all but one of said conveyor driving sprockets, corresponding sprocket drive means secured on said first shaft and interconnected with said different size sprockets, and manual control means for interconnecting all but one of said conveyor drive sprockets to said different size sprockets respectively, whereby all of the conveyors move at different speeds, said control means being shiftable disengaging said different size sprockets from said conveyor drive sprockets and interconnecting said conveyor drive sprockets with said second shaft whereby all conveyors move at the same speed.

2. In a food broiling oven having a framework, a body and end walls, a series of laterally spaced parallel conveyors movably mounted upon said framework and extending horizontally through central portions of said body and outwardly of said end walls, a series of longitudinally spaced food supporting hooks projecting from said conveyors throughout their length, a power driven shaft mounted on said framework transversely of said conveyors, a second driven shaft on said framework parallel to and connected with the first shaft, a series of drive sprockets of the same size on said second shaft corresponding to each conveyor and operatively joined thereto in driving relation for moving said conveyors at the same speed, all but one of said conveyors incorporating means for changing its speed of travel, each of said latter means including a driven sprocket loosely journaled on said second shaft and interconnected with said first shaft for movement at a predetermined speed, a drive disc secured upon said second shaft for movement at a different speed, a control disc journaled on said second shaft and manually slidable thereon, and locking means on said control disc engageable in driving relation with said conveyor drive sprocket and said driven sprocket, and on adjustment selectively engageable with said drive disc and conveyor drive sprocket.

3. In a food broiling oven having a framework, a body and end walls, a series of laterally spaced parallel conveyors movably mounted upon said framework and extending horizontally through central portions of said body and outwardly of said end walls, a series of longitudinally spaced food supporting hooks projecting from said conveyors throughout their length, a power driven shaft mounted on same framework transversely of said conveyors, a second driven shaft on said framework parallel to and connected with the first shaft, a series of drive sprockets of the same size on said second shaft corresponding to each conveyor and operatively joined thereto in driving relation for moving said conveyors at the same speed, all but one of said conveyors incorporating means for changing its speed of travel, each of said latter means including a driven sprocket loosely journaled on said second shaft and interconnected with said first shaft for movement at a predetermined speed, a drive disc secured upon said second shaft for movement at a different speed, a control disc journaled on said second shaft manually slidable thereon, locking means on said control disc engageable in driving relation with said conveyor drive sprocket and said driven sprocket, and on adjustment selectively engageable with said drive disc and conveyor drive sprocket, a manually shiftable rod on said framework parallel to said second shaft, and a series of U-shaped stirrups mounted on and projecting laterally from said rod loosely and retainingly engaging the respective control discs.

4. In the food broiling oven of claim 1, a pair of parallel spaced guide channels mounted within the oven body above said conveyors and extending the length of said body adapted to slidably receive and support a cooking utensil, and an upwardly extending push rod joined to one of said conveyors and operatively engaging said utensil for slidably moving the same throughout the length of said broiler.

5. In the food broiler of claim 1, a pair of parallel spaced guide channels mounted within the oven body above said conveyors and extending the length of said body adapted to slidably receive and support a cooking utensil, an upwardly extending push rod joined to one of said conveyors and operatively engaging said utensil for slidably moving the same throughout the length of said broiler, and horizontally disposed loading platforms mounted upon and projecting outwardly from opposite ends of the body in substantial alignment with said guide channels adapted to slidably receive said utensil.

6. The food broiler of claim 1, and a series of food unloaders mounted at and upon one end of said body adjacent the respective end of each conveyor, each unloader including an upright plate arranged at an acute angle to the path of movement of a conveyor so as to cam against moving articles of food suspended from said hooks disengaging the same therefrom, the upright plates of said unloaders curving outwardly at their lower ends and terminating in horizontal receiving platforms arranged in vertically spaced relation to each other for accumulating cooked objects from each conveyor.

7. The food broiling oven of claim 1, a series of food unloaders mounted at and upon one end of said body adjacent the respective end of each conveyor, each unloader including an upright plate arranged at an acute angle to the path of movement of a conveyor so as to cam against articles of food suspended from said hooks disengaging the same therefrom, the upright plates of said unloaders curving outwardly at their lower ends and terminating in horizontal receiving platforms arranged in vertically spaced relation to each other for accumulating cooked objects from each conveyor, and an upright marginal flange upon the outer edge of said upright plates and platform retainingly engaging said articles of food.

References Cited in the file of this patent

UNITED STATES PATENTS

| | | |
|---|---|---|
| 712,533 | Hewlett | Nov. 4, 1902 |
| 1,106,271 | Ayres | Aug. 4, 1914 |
| 1,599,556 | Cook | Sept. 14, 1926 |
| 1,854,850 | Linkenauger | Apr. 19, 1936 |
| 2,225,068 | Marriott | Dec. 17, 1940 |
| 2,418,089 | Newman | Mar. 25, 1947 |
| 2,419,643 | Hudson | Apr. 29, 1947 |
| 2,504,516 | Goodell | Apr. 18, 1950 |
| 2,520,067 | Sagen | Aug. 22, 1950 |
| 2,655,096 | Ebin | Oct. 13, 1953 |
| 2,688,685 | Goodell | Sept. 7, 1954 |